2,890,186

MODIFIED DIALKYL FUMARATE ALKYD RESIN REACTED WITH A VINYL AROMATIC COMPOUND, A VINYL CYANIDE AND AN ACRYLATE

James H. Sample, Chicago, Ill., assignor to The Sherwin-Williams Company, Cleveland, Ohio, a corporation of Ohio No Drawing. Application June 6, 1956
Serial No. 589,577

12 Claims. (Cl. 260—22)

This invention relates to non-gelled resinous materials which are the reaction products of oil modified, or oil acid modified, alkyds further modified with at least three different monomers. More particularly, this invention relates to resinous materials comprising drying or semi-drying oil modified or drying or semi-drying oil acid modified alkyds further modified with monomeric polymerizable materials comprising a vinyl aromatic compound, e.g., vinyl toluene, a vinyl cyanide, e.g., acrylonitrile, and an acrylic ester, e.g., methyl methacrylate. This invention further relates to the processes of preparing these resinous compounds.

Automotive finishing and refinishing places heavy demands upon any coating composition to be used for these purposes. Up until the present time the art has had to compromise on certain properties in order to secure others. For example, if fast dry is formulated into the compound, there may be a sacrifice of stability toward climatic conditions. Thus under conditions of high temperature and high humidity, such fast dry materials may exhibit wrinkling.

It is a principal object of the present invention to provide a very fast drying vehicle with no tendency to wrinkle under conditions normally productive of wrinkling.

Another problem associated with prior coatings is overspray, i.e., atomized paint, unintentionally falling on previously coated panels or areas. It has been found with coatings formulated with the novel vehicles of this invention that overspray problems are easily avoided. Overspray unexpectedly disappears after a short time or is absorbed in a second pass of the gun. It is a further object, therefore, to provide a vehicle of improved overspray characteristics.

Today air drying and baking finishes require entirely different formulations, the closest approach to a universal finish appearing in compositions requiring only the addition of a catalyst or "converter" to a normally air drying formula. The compositions made with these novel vehicles do not require "converters." It is another object of this invention to provide a vehicle useful in air drying and baking formulas (which may be the same) requiring no converter to impart utility as baking enamels.

Other advantages obtained in the use of these vehicles include higher initial gloss, improved gloss retention, better flow, resistance to skinning in the package, improved odor, reduced chalking, improved hardness and printing resistance, reduced mildew accumulation, etc.

Other objects will appear as the description proceeds.

Broadly stated, this invention comprises as a new composition of matter, a non-gelled interpolymer useful for coating compositions, of an oil modified dialkyl fumarate alkyd and at least three monomers; a monomeric monovinyl aromatic compound, a monomeric ester of an unsaturated aliphatic acid having the formula:

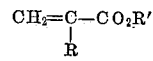

$$CH_2=C-CO_2R'$$
$$|$$
$$R$$

wherein R is selected from the group consisting of hydrogen and alkyl radicles of from 1 to 4 carbon atoms and R' is an alkyl radicle of from 1 to 8 carbon atoms and a monomeric vinyl cyanide. The amount of monomer composition by weight used to modify the alkyd ranges from about 0.5 to about 2 times the weight of the oil acid used, or the converted acid content of the oil used, in the alkyd.

The monomers may be reacted as a ternary mixture, one followed by a mixture of the other two, a mixture of two followed by reaction with the third, or reacted singly and sequentially. Moreover, the oil portion of the alkyd may be treated with the monomers prior to alkyd formation. In a preferred embodiment, the oil-modified dialkyl fumarate alkyd is reacted with a ternary mixture of the above-mentioned monomers.

THE ALKYD PORTION OF THE VEHICLE

As indicated above, the new resinous compounds of this invention are best produced by co-reacting a mixture of at least three polymerizable monomers and a dialkyl fumarate alkyd resin. Ordinarily these alkyds are prepared prior to modification with the monomers, although conveniently there is no interruption of the cooking operation.

Alkyd resins of the type herein contemplated are produced by the interaction of at least three materials; namely, a polybasic acid, a dialkyl fumarate, a polyhydric alcohol, and a drying oil or semi-drying oil fatty acid or alcoholized drying or semi-drying oil. Other modifying agents may be present in the reaction mass such as, for example, monocarboxylic acids, e.g., benzoic acid, crotonic acid, etc. The alkyds may also be modified with rosin or phenolic resins, or other well known materials. Two principal techniques have been developed for the preparation of such modified alkyds, e.g., solvent method and fusion method. For the present purposes, the manner of producing the modified alkyd is relatively unimportant. Accordingly, where reference is made to a drying oil or semi-drying oil modified dialkyl fumarate alkyds herein, alkyds are contemplated whether produced by (a) the direct esterification reaction of semi-drying oil fatty acids with the polycarboxylic acid and the polyhydric alcohol or (b) the indirect esterification wherein a drying oil or semi-drying oil is first alcoholized with a polyhydric alcohol and thereafter esterified with a polybasic acid, under either of the principal techniques mentioned.

It is, of course, understood that multiple components may be present in the reaction mass, and instead of one drying or semi-drying oil, a mixture of drying or semi-drying oils and/or fatty acids, one or more polybasic acids, and one or more polyols may be used. The reaction may be carried out in the presence or absence of catalysts and in the presence or absence of solvents.

The unsaturated aliphatic drying oil or semi-drying oil acids are preferably those derived from naturally occurring oils of animal, vegetable or marine origin, particularly those derived from drying oils and semi-drying oils. These acids may be either non-conjugated or conjugated and may be employed as the monomer, dimer and/or trimer. Such preferred acids have an iodine value of from about 120 to about 425. Specific examples of unsaturated aliphatic acids useful in accordance herewith for the production of oil-modified alkyd resins are as follows:

Table I

| Fatty Acid | Empirical Formula | Natural Source |
|---|---|---|
| Hiragonic | $C_{16}H_{26}O_2$ | Japanese Sardine Oil. |
| Linoleic | $C_{18}H_{32}O_2$ | Cottonseed Oil. Soyabean Oil. Poppy Seed. Peanut Oil. Linseed Oil. Corn Oil. Perilla. Sunflower Seed. Sesame. |
| Iso-linoleic | $C_{18}H_{32}O_2$ | Castor Oil (dehydrated). |
| Linolenic | $C_{18}H_{30}O_2$ | Castor Oil (dehydrated). Linseed. Perilla. Hempseed. |
| Elaeostearic | $C_{18}H_{30}O_2$ | Tung. |
| Punicic | $C_{18}H_{30}O_2$ | Pomegranate. |
| Paranaric | $C_{18}H_{28}O_2$ | Seed Fats. |
| Arachidonic | $C_{20}H_{32}O_2$ | Brain, liver, blood and depot fats. |
| Clupanodonic | $C_{22}H_{34}O_2$ | Marine animal oils, e.g., menhaden. |
| Scoliodenic | $C_{24}H_{38}O_2$ | Marine animal oils. |
| Nisinic | $C_{24}H_{36}O_2$ | Do. |
| Tariric | $C_{18}H_{32}O_2$ | Seed Fat. |
| Licanic | $C_{18}H_{28}O_3$ | Oiticica oil. |
| Abietic | $C_{20}H_{30}O_2$ | Rosin. Tall Oil. |

Natural oils of the drying or semi-drying types, as exemplified above, are generally mixtures of glycerides of two or more of the acids named together with other glycerides, e.g., glyceryl oleate, glyeryl stearate and miscellaneous ingredients, e.g., phosphatides. Procedures for producing mixed acids of such oils are well known, e.g., "splitting" and such commercial acids are a preferred starting material. Thus there may be employed dehydrated castor oil fatty acids; linseed oil fatty acids, soya-bean oil fatty acids, tung oil fatty acids, rosin acids, tall oil acids, etc., the individual purified and segregated acids contained therein, or the fatty acids named above and synthesized by known methods. Also as indicated such acids may be isomerized, or converted to the dimer or trimer prior to use herein. Polyethenoid acids of the conjugated, non-conjugated, or mixed conjugated, non-conjugated types may be used. In the preparation of coating composition vehicles, the drying oil fatty acids, and particularly the vegetable drying oil fatty acids are preferred.

Another of the essential components of the dialkyl fumarate alkyd resins used in this invention is a polyhydric alcohol. These are aliphatic polyhydroxy compounds containing two or more hydroxy radicals. Those which may be used in accordance with this invention include for example, ethylene glycol, diethylene glycol, propylene glycol, glycerine, trimethylolethane, trimethylolpropane, pentaerythritol, polypentaerythritol, pinacol, polyallyl alcohol, arabitol, xylitol, sorbitol, mannitol, mixtures of these, etc. In the preferred cases, polyhydric alcohols containing three or more hydroxy radicals are employed.

Under certain circumstances it will be found desirable to use in conjunction with the polyol or mixture of polyols, a monohydric alcohol. Examples of such monohydric alcohols include hydroabietyl alcohol, soya fatty alcohols, etc.

The third essential component of the alkyds useful in this invention is a polybasic acid. Specific examples of polybasic acids and/or derivatives of polybasic acids useful alone or in admixture with another polybasic acid in accordance with this invention include the following: phthalic acid, phthalic anhydride, maleic acid, maleic anhydride, citric acid, tartaric acid, fumaric acid, isophthalic acid, terephthalic acid (preferably in admixture with another dibasic acid), adipic acid, sebacic acid, tetrahydrophthalic anhydride, tetrachlorophthalic anhydride.

The most commonly used dibasic acid is, of course, phthalic anhydride, alone or in admixture with one or more of the others listed above.

The fourth essential ingredient of the alkyds of this invention is a dialkyl fumarate. These esters of fumaric acid may contain from 1 to 5 carbon atoms in the alkyl group. Thus dimethyl fumarate, diethyl fumarate, dipropyl fumarate, di-n-butyl fumarate, di-isobutyl fumarate, diamyl fumarate, and the equivalents of these esters may also be used, e.g., the corresponding dialkyl maleates.

In accordance with well known production techniques, the alkyds useful in accordance with this invention are prepared having an oil length of from about 50% to about 80%. In general, acid values of the final alkyds are maintained at less than about 40. The excess of hydroxyl groups over the available carboxylic acid groups as calculated in the admixing of the ingredients may range up to 50% over that theoretically required to react with the carboxyl content of the reaction mass. It may seem difficult of reconciliation that these materials have an acid number and at the same time an excess of hydroxyl. This may be explained by the fact that esterification occurs during heating of these reactants at elevated temperatures and if heating is carried on too far, gellation ensues. The product becomes solid and useless. Therefore, the "cook" is discontinued usually prior to complete reaction of all the carboxyl groups with available hydroxyl groups. Thus the product has an acid value; at the same time it contains what may amount to an excess of hydroxyl.

In the examples given later in the specification, reference will be had to certain oil-modified alkyds in terms of the ingredients inter-reacted to produce them. It will be understood that customary alkyd formation techniques are employed and that the products have oil lengths, acid values and hydroxyl contents within the ranges above specified.

With the exception of the fumarate modification of the alkyds hereof, these alkyds are similar to the usual types with which paint and varnish makers are familiar. For the purposes of this invention, alkyds produced by direct esterification from drying or semi-drying oil acids are the full equivalent of alcoholized oils of the drying or semi-drying types, natural or synthetic. Thus oils may be used instead of fatty acids, or mixtures of oils, or of acids or of acids and oils.

Among the wide variety of oil modified or oil-acid modified dialkyl fumarate alkyds useful in accordance herewith are the following:

Table II (1) 60% soya fatty acid, glycerine, dibutyl fumarate phthalate
(2) 52% linseed oil, pentaerythritol, dibutyl fumarate phthalate
(3) 80% linseed, pentaerythritol, diethyl fumarate phthalate
(4) 70% dehydrated castor oil, pentaerythritol, diamyl fumarate phthalate
(5) 50% oil (4:1 soya-dehydrated castor), pentaerythritol, dibutyl fumarate phthalate
(6) 75% linseed, trimethylol ethane, dibutyl fumarate phthalate
(7) 55% safflower, glycerol, dibutyl fumarate phthalate
(8) 60% linoleic acid, glycerol, dimethyl fumarate phthalate The percentages expressed above and in subsequent references to alkyd resins refers to the percentage of oil calculated as the glyceride in the final product at 100% solids. It does not matter whether the modification is by reaction of the oil fatty acid or the oil itself through alcoholysis; the designation will be the same.

Many other alkyds are known and may be used for the further monomer modifications of this invention. These alkyds and their equivalents may also be used as diluents for the alkyds monomer modified as hereinafter described. The improved compatability of the monomer modified alkyds with the above alkyds over a wide range is a principal advantage of these products.

MONOMER MODIFICATION OF ALKYDS

The alkyds above described either as solutions in suitable solvents, e.g., xylol or a petroleum naphtha, or as 100% solids varnishes are preferably modified with a monomer admixture composed of three polymerizable monomeric liquids; e.g., (a) at least one vinyl aromatic compound, (b) at least one acrylic compound, and (c) at least one vinyl cyanide.

The polymerizable unsaturated monomeric materials useful in the preparation of a monomer mixture are generally mono-olefinic compounds of relatively low molecular weight, e.g., less than 250. These materials are capable by themselves of undergoing polymerization, i.e., one molecule of the material combining with another molecule or molecules of the same material, the resulting polymer being characterized by a recurring structural unit as distinguished from an interpolymer wherein two or more different molecules interact to form high molecular weight materials of indefinite structure. Thus the term "polymerizable" as used herein is intended to mean the property of the individual monomeric materials to react with themselves under appropriate conditions to yield polymers characterized by recurring structural units. These unsaturated materials are generally characterized by the group $CH_2=C<$.

The theory of mechanism of reaction and the structure of the final product of the reactions herein disclosed are not known. It is believed, however, that the product is in the nature of an interpolymer in which the combination of monomers has been tied into the alkyd through the unsaturated portion of the oil. Quite probably a small portion of one, or a combination of the several monomers, may polymerize with itself, or with one or more other monomers. The acrylate esters may become an integral part of the polymer through an ester interchange reaction becoming esterified through a hydroxyl of the alkyd polymer. A higher proportion of hydroxyl content would seem to favor this type of reaction.

As indicated above, the monomer admixture contains as one of the essential ingredients a vinyl aromatic compound. Industrially important examples of the vinyl monomers contemplated for use in accordance with the invention include the following:

*Table III*

Vinyl monomers:
  Aromatic hydrocarbons—
    Styrene
    Alpha methyl styrene
    Para methyl styrene
    Ortho-methyl styrene
    Meta-methyl styrene
    Alpha, para dimethyl styrene
    Vinyl naphthalene
    Acenaphthalene
    Vinyl toluene (mixed o-, m-, p-methyl styrenes)
  Aromatic halides, e.g.—
    Para chlorostyrene
    Para fluorostyrene
    Para trichloromethyl styrene
    2,5-dichlorostyrene
  Miscellaneous vinyl monomers, e.g., para methoxy styrene Mixtures of the foregoing materials, for example, styrene and vinyl toluene may also be employed. In the preferred embodiments of this invention the vinyl aromatic hydrocarbons, e.g., styrene, vinyl toluene and vinyl naphthalene are employed.

The amount of the vinyl aromatic compound ranges between about 10% and 85% by weight of the total amount of monomers used. For most purposes, amounts within the range of 25% to 60% by weight have been found to be satisfactory. The vinyl aromatic compound seems to improve the rate of drying and aids the film in developing early hardness. Vinyl toluene in particular seems to aid solvent solubility, reducing the amount of strong solvents required.

The acrylates used in the monomer modification include the alkyl acrylates, e.g., methyl acrylate, ethyl acrylate, propyl acrylate, iso-propyl acrylate, butyl acrylate, octyl acrylate, etc., the alkyl methacrylates, e.g., methyl methacrylate, ethyl methacrylate, propyl methacrylate, iso-propyl methacrylate, butyl methacrylate, capryl methacrylate, 2-ethyl hexyl methacrylate, n-octyl methacrylate, etc.; the ethacrylates, e.g., methyl, ethyl, propyl, butyl, and other such low molecular weight alkyl ethacrylates. Because of availability, methyl methacrylate is most conveniently utilized. When the higher alcohol esters are used, e.g., the butyl to octyl alcohol acrylates or alkacrylates, a plasticizing effect is exerted on the film. Accordingly, the percentage is desirably held in the lower portion of the permissible range to maintain good dry rate, stability, viscosity, etc., as well as adequate flexibility. The percentage of acrylate ester of the total monomer used may vary from 10% to 85%, and is desirably in the range of 25% to 60% by weight.

Vinyl cyanides, useful as the third modifying monomer, will be recognized as acrylonitrile or a homologue thereof. Thus acrylonitrile and low molecular weight alkyl substituted acrylonitriles are useful. Examples include acrylonitrile, methacrylonitrile, ethylacrylonitrile, propylacrylonitrile, etc.; the alkyl substituent groups containing up to 5 carbon atoms. There may be used in the monomer modification up to 50% by weight of acrylonitrile although for most purposes amounts ranging between 5% and 15% by weight are quite satisfactory. The vinyl cyanide aids in imparting rapid hardness, film gloss, and improves the drying rate of the alkyd. If the proportions become high, i.e., above about 20%, stronger solvents should be used to maintain compatibility.

Interpolymerization of the monomers with the unsaturated component or components of the alkyd is conveniently effected with catalyst of the peroxide type, e.g., ditertiary butyl peroxide, tertiary-butyl hydroperoxide, cumene hydroperoxide, benzoyl peroxide, acetyl peroxide, lauroyl peroxide, etc. and mixtures thereof. The amount of catalyst usually ranges from 0.05% to 5% of the weight of the reactants. "Redox" catalysts may also be used, e.g., a peroxide plus a reducing sugar, a peroxide plus an amine, a peroxide plus a metal salt, etc.

Typical examples of redox catalysts include cumene hydroperoxide plus dextrose (1:1); benzoyl peroxide plus ferric sulphate (1:1); cumene hydroperoxide plus propylene diamine (1:1). The catalyst or catalyst mixture is conveniently added to the monomer mixture. It is sometimes convenient to mix a part of the catalyst to a part of one or more of the monomers and add this to the alkyd before beginning the major part of addition of the monomers. The purpose of this procedure is to provide sufficient quantity of catalyst to initiate the reaction. The remaining catalyst replaces that already used as the addition progresses. Experience has shown that this procedure gives faster reactions enabling reduction of the monomer addition time from about 4 hours to about 3 hours. Higher conversion of the monomer is also obtained by using this procedure. Finally, the addition of catalyst in solution in one or a mixture of monomers is a safety measure since the technique reduces the danger of catalyst decomposition on contact with the hot walls of the reaction vessel.

The total amount of monomer used in the further modification of the alkyds above described ranges from about .5 to about 2 times the weight of the oil acid component used in the alkyd. Such oil acid component may be derived in the final alkyd from use in the manufacture thereof of either the oil acid or the oil itself. For most purposes a ratio of 1:1 to 1:1.5 is satisfactory.

Reference will be had herein to "ternary monomer modified alkyds" by which will be understood an oil modified alkyd modified with three types of monomer material independently of the time or manner of addition of the monomers.

METHOD OF MAKING THE RESINS

The alkyd is processed in the usual manner familiar to those skilled in the art. In the manufacture of the alkyd, cooking is continued until an acid value of 40 or less has been secured and desirably so that the cure rate is not less than 30 seconds. In general, the processing temperature for the alkyd may be from 360 to 450° F. Conventional inert gas blowing may be used in fusion processing and for this purpose carbon dioxide, nitrogen or helium may be used. If it is desired, the alkyd may be made by the solvent method. The monomers may be first reacted with the oil or fatty acid or mono glyceride and then the alkyd completed in the conventional manner. Ordinarily, however, the process is one of modifying a previously prepared alkyd.

The addition of monomers is generally made at temperatures of from about 240° to about 300° F. if the addition is to be completed in 2 to 5 hours. Higher temperatures may be used if a longer addition time is permitted and the hold time is reduced. Under these conditions, the addition is made so that the monomers combine at the rate they are added. Refluxing is held down as much as possible. When the addition is rapid, i.e., from 2 to 5 hours, the mixture is held an additional 2 to 6 hours for complete reaction. During this period, the temperature is gradually raised to 400°–460° F. Finally, an inert gas blow is used to remove the last trace of free monomer. Interpolymerization may be carried out under an inert gas blanket, if desired.

It becomes convenient at this point to illustrate the process of manufacturing the modified alkyds of this invention. It is to be understood that these examples are for illustrative purposes only to acquaint those skilled with the art with the best mode known to the inventors for producing these materials. It is not intended that the scope of the invention shall be limited to the extent of the examples here given.

The quantities indicated for the various materials in the following examples are in terms of parts by weight unless otherwise indicated and all temperatures are in terms of degrees Fahrenheit.

The apparatus used in the following examples was either (1) a 3 necked round flask or (2) a stainless steel kettle. The flask is equipped with an agitator (center neck), a blow tube for inert gas and a thermometer using one side neck and a water separator and condenser in the other side neck during solvent reflux. This neck may be open or have an air condenser tube during the preparation of the alkyd by the fusion process prior to monomer addition. The monomer mixture is added drop-wise from a separatory funnel using a Y-tube to accommodate both the water separator and the funnel.

The stainless steel kettle is similar except the top has four openings and a thermocouple replaces the thermometer. During solvent processing or monomer addition a gasket of inert material (Teflon, aluminum foil wrapped asphalt or asbestos, etc.) is placed between the kettle and the top. They are then held securely in place with C-clamps.

EXAMPLE I

The following materials in the amounts indicated were reacted in a 2 gallon stainless steel kettle to produce an alkyd by the fusion cook method.

| | |
|---|---|
| 1. Soya fatty acids | 1950 |
| 2. Glycerine | 480 |
| 3. Phthalic anhydride | 555 |
| 4. Dibutyl fumarate | 345 |

The materials were admixed, placed in the kettle and blanketed with carbon dioxide. The temperature was raised to 450° F. at which point it was held until an acid value of 10 was obtained.

The product was strained and found to have the following characteristics:

| | |
|---|---|
| Viscosity | $Z_1+$ |
| Color (Gardner) | 9 |
| Acid number | 9.4 |
| Weight per gallon | 8.50 |
| Final cure, greater than 2 minutes. | |

1350 parts of the alkyd thus produced were heated to 290° F. At this point a mixture having the following composition was added slowly to the alkyd:

| | |
|---|---|
| Vinyl toluene | 405 |
| Methyl methacrylate | 405 |
| Acrylonitrile | 90 |
| Ditertiary butyl peroxide | 22.5 |

The addition of the ternary monomer mixture including the catalyst was complete in slightly less than 4 hours. The mixture was held until a 10 second cure was obtained, about 15 minutes additional. The product was then cut with high flash naphtha in the amount of 150 parts.

The base yield of product was 1798 parts which was cut with high flash naphtha to give a 75–25% solution.

The product had the following characteristics:

| | |
|---|---|
| Viscosity _____min__ | 15–20 |
| Color (Gardner) | 9 |
| Acid value | 5–6 |
| Weight per gallon | 8.51 |
| Final cure _____seconds__ | 6 |

EXAMPLE II

The following materials in the amounts indicated were reacted in 5 liter glass flask to produce an alkyd by the solvent method.

| | |
|---|---|
| 1. Soya fatty acids | 1300 |
| 2. Glycerine | 320 |
| 3. Phthalic anhydride | 370 |
| 4. Dibutyl fumarate | 230 |
| 5. Xylene, as needed. | |

All of the ingredients were added to 450° F. maintaining a constant reflux and held for an acid value of approximately 12. The entire cook took 6 hours and 10 minutes. The base yield at 100% non-volatile material was 2110 parts. This alkyd had the following characteristics:

| | |
|---|---|
| Viscosity (Gardner-Holdt) | Y |
| Color | 6 |
| Acid number | 12.6 |
| Final cure, greater than 2 minutes. | |

Utilizing a 2 liter glass flask, 360 parts of the above alkyd were diluted with 720 parts of xylene and heated to 290° F. Thereafter a mixture of 240 parts of styrene, 240 parts of ethyl methacrylate, 120 parts of acrylonitrile and 10 parts of ditertiary butyl peroxide were added drop-wise over a 6 to 7 hour period, and the reaction mass held for a low cure rate (below 5 seconds) and complete conversion. The base yield of product obtained was 1610 parts. This product had the following characteristics:

| | |
|---|---|
| Viscosity (Gardner-Holdt) | $Z_6$ |
| Color (Gardner) | 12 |
| Acid number | 6.3 |
| Final cure _____seconds__ | 2 |

EXAMPLE III

Utilizing 720 parts of the alkyd produced in accordance with Example I, a ternary monomer modified alkyd was produced in accordance with the following:

The above weight of the alkyd was cut with 1440 parts of xylene and the temperature of the mixture raised to 290° F. At this point, a mixture of 240 parts vinyl toluene, 240 parts of methyl methacrylate, 240 parts of acrylonitrile and 20 parts of ditertiary butyl peroxide were started into the alkyd-solvent mass. The addition of the monomer mixture was complete in 6½ hours, the temperature being maintained at 250° F. Thereafter, the temperature was held at 250° F. until a cure of 3 seconds was obtained. The whole period occupied a time of 8 hours. The base yield of product was 1411 parts which was cut with a like weight of xylene. The resultant product had the following characteristics:

| | |
|---|---|
| Viscosity (Gardner-Holdt) | M |
| Color (Gardner) | 12 |
| Acid value | 4.8 |
| Weight per gallon | 7.86 |
| Final cure ____seconds | 4 |

Generally, the ternary monomer modified alkyds hereof in solution in mineral spirits, Hi-Flash naphtha, xylol, etc. to the extent of 40% to 80% solids have viscosities ranging from F–$Z_5$ on the Gardner-Holdt scale, and higher, e.g., at 80% solids viscosities of 20–50 minutes are not unusual.

Generally, as the percentage of vinyl cyanide is increased in the modified alkyds hereof, there is a tendency to reduced compatibility in the mineral spirits type thinners.

The colors are preferably below 15, usually in the range of 4–9 Gardner. The acid value is preferably under about 40 and the final cure under about 20 seconds.

Although these products have particular adaptability as automotive refinishing vehicles, which are primarily air dried coatings, they have been demonstrated to be very satisfactory in automotive production baking finishes, with or without urea or melamine-aldehyde resins such as, for example, melamine-formaldehyde, butylated melamine-formaldehyde resins, urea-formaldehyde and the like. These materials are also useful as vehicles for other industrial finishing purposes involving both air drying and baking. A satisfactory baking schedule for formulations including these resins is 30 minutes at 200° F. or 10 minutes at 300° F., or any suitable intermediate schedule.

Thus, these materials are useful not only in automotive enamel formulations but also as clear vehicles, or varnishes and industrial metal finishing formulations, e.g., business machines, transportation finishes and the like. As an example of the commercial importance of the compositions of this invention, a standard formulation utilizing the vehicle of Example I was prepared according to the following formula:

*Red enamel*

| | Wt. (grams) | Percent |
|---|---|---|
| Pigment 7.7%: | | |
| Dark toluidine red | 402 | 81.70 |
| Indanthrene maroon | 11.5 | 2.33 |
| Rutile titanium dioxide | 78.5 | 15.97 |
| Total pigment | 492.0 | 100.00 |
| Vehicle 92.3%: | | |
| Alkyd of Example I (introduced at 50% solids in high-flash naphtha) | 4,895.0 | 82.96 |
| Soya lecithin | 0.2 | trace |
| Xylene | 1,004.8 | 17.03 |
| Total vehicle | 5,900.0 | 100.00 |
| Total weight | 6,392.0 | |
| Resin solids, 38.3%. | | |
| Total solids, 46.0%. | | |

The foregoing enamel is desirably reduced with an equal weight of a reducer having the following formula:

45% lacquer diluent naphtha
55% toluol

For spray application, coatings formulated with the vehicles of this invention desirably utilize a reducer of the foregoing type. Formulation of the automotive paints follows standard procedure known to those skilled in the art. These vehicles may also be used in the production of finishes for material of the baking or air drying types again following standard formulation techniques for the industrial finishes.

The reducers which are useful in cutting the enamels to sprayable consistency are mixtures of aliphatic and aromatic hydrocarbons with or without monohydric alcohols such as ethanol, propanol, isopropanol, normal-, secondry-, or isobutanol. Specific examples include the following:

(a) 45% VM&P naphtha
    55% xylol
(b) 35% lacquer diluent naphtha
    55% toluol
    10% ethanol Drier compositions may also be included in these enamels, for example, 1 to 2% zirconium octoate (6% metal) drier with or without 0.01% to 0.1% cobalt naphthenate and 0.02 to 0.2% manganese naphthenate. Driers are not necessary in these compositions although they may be used if desired.

Other modes of applying the principle of this invention may be employed instead of those specifically set forth above, changes being made as regards the details herein disclosed, provided the elements set forth in any of the following claims or the equivalent of such be employed.

It is, therefore, particularly pointed out and distinctly claimed as the invention:

1. A composition of matter comprising the reaction product produced by heating at a temperature in the range of from about 240° F. to about 460° F. in the presence of a catalyst, (I) an oil modified alkyd prepared by reacting a polycarboxylic acid, a dialkyl fumarate, an aliphatic monocarboxylic material selected from the group consisting of the acids of drying oils, the acids of semi-drying oils, and mixtures of such acids, and drying oils, semi-drying oils and mixtures thereof; and a saturated aliphatic polyhydric alcohol, said alkyd having an oil length of from about 50% to about 80%, an acid value of less than about 40, and an excess of hydroxyl ranging up to about 50% of that theoretically required to react with the carboxyl content; and (II) a monomer composition prepared by admixing: (a) from about 10% to about 85% by weight of said monomer composition of a polymerizable monomeric monovinyl aromatic compound; (b) from about 5% to about 85% by weight of said monomer composition of a polymerizable monomeric ester of an unsaturated aliphatic acid having the formula:

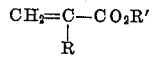

$$CH_2=C-CO_2R'$$
$$|$$
$$R$$

wherein R is selected from the group consisting of hydrogen and alkyl radicles of from 1 to 4 carbon atoms and R' is an alkyl radicle of from 1 to 8 carbon atoms, and (c) from about 10% to about 50% by weight of said monomer composition of a monomeric nitrile selected from the group consisting of acrylonitrile, methacrylonitrile and ethacrylonitrile; the amount of monomer composition by weight used to modify said alkyd being from about 0.5 to about 2 times the weight of the oil acid component present in said alkyd.

2. A composition in accordance with claim 1 in which II(a) is a monovinyl aromatic hydrocarbon.

3. A composition in accordance with claim 1 in which II(a) is a vinyl toluene.

4. A composition in accordance with claim 1 in which II(a) is styrene.

5. A composition in accordance with claim 1 in which II(b) is an alkyl methacrylate.

6. A composition in accordance with claim 1 in which II(b) is methylmethacrylate.

7. A composition in accordance with claim 1 in which II(b) is an alkyl acrylate.

8. A composition in accordance with claim 1 in which II(b) is ethyl acrylate.

9. A composition in accordance with claim 1 in which II(c) is acrylonitrile.

10. A composition in accordance with claim 1 in which II(a) is vinyl toluene, II(b) is methyl methacrylate and II(c) is acrylonitrile.

11. A composition in accordance with claim 1 in which I is a soya fatty acid glycerine phthalic anhydride dibutyl fumarate alkyd, II(a) is vinyl toluene, II(b) is methyl methacrylate and II(c) is acrylonitrile.

12. A composition of matter comprising the reaction product produced by heating at a temperature in the range of from about 240° F. to about 460° F. in the presence of ditertiary butyl peroxide, (I) 1350 parts by weight of an oil modified dialkyl fumarate prepared by reacting 1950 parts of soya fatty acid, 480 parts of glycerine, 555 parts of phthalic anhydride and 345 parts of dibutyl fumarate, said alkyd having an oil length of from about 50% to about 80%, an acid value of less than about 40, and an excess of hydroxyl ranging up to about 50% of that theoretically required to react with the carboxyl content; and (II) a monomer composition prepared by admixing (a) 405 weight parts of vinyl toluene, (b) 405 weight parts of methyl methacrylate, and (c) 90 weight parts of acrylonitrile; the amount of monomer composition by weight used to modify said alkyd being from about 0.5 to about two times the weight of the oil acid component present in said alkyd.

References Cited in the file of this patent

UNITED STATES PATENTS

| | | |
|---|---|---|
| 2,600,623 | Daniel et al. | June 17, 1952 |
| 2,686,765 | Arvin | Aug. 17, 1954 |

FOREIGN PATENTS

| | | |
|---|---|---|
| 744,273 | Great Britain | Feb. 1, 1956 |